No. 763,276. PATENTED JUNE 21, 1904.
J. P. GARDNER.
HORSE DETACHER.
APPLICATION FILED JULY 7, 1903.
NO MODEL. 2 SHEETS—SHEET 1.
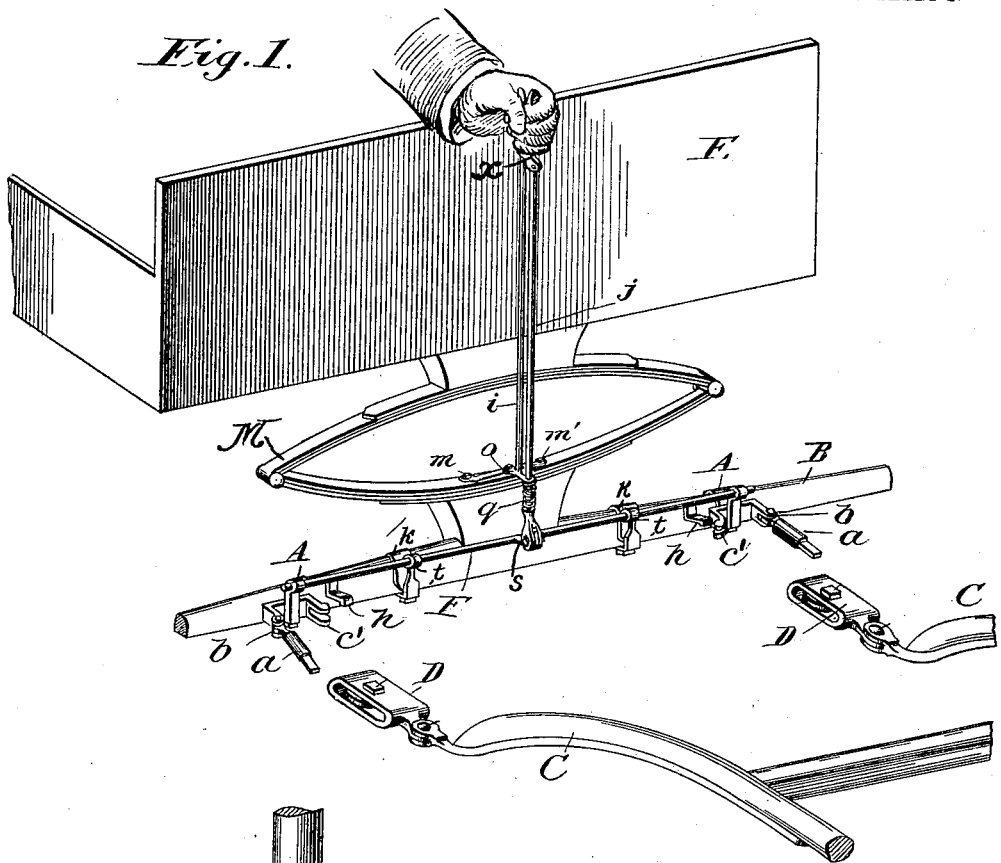
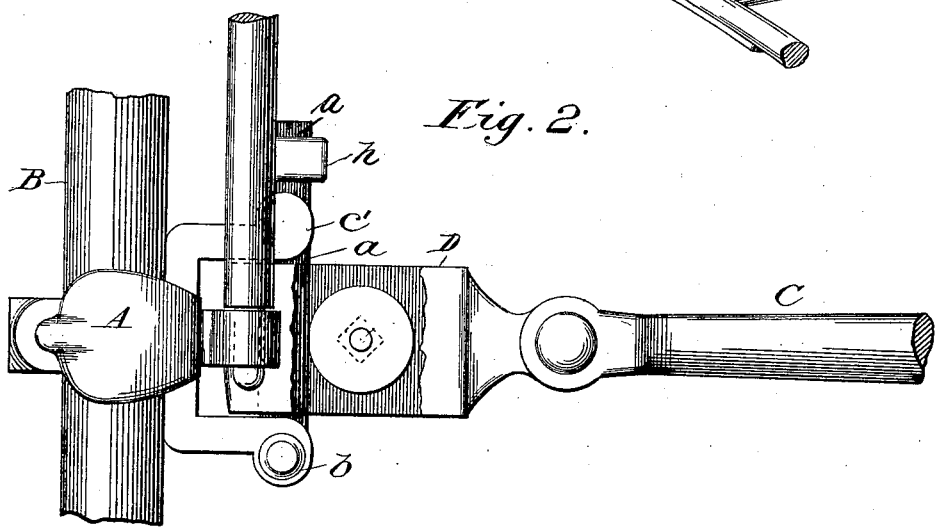
Witnesses:
Inventor:
John P. Gardner.

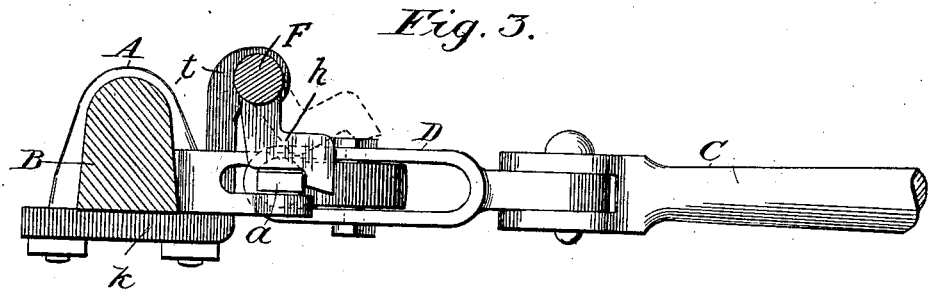
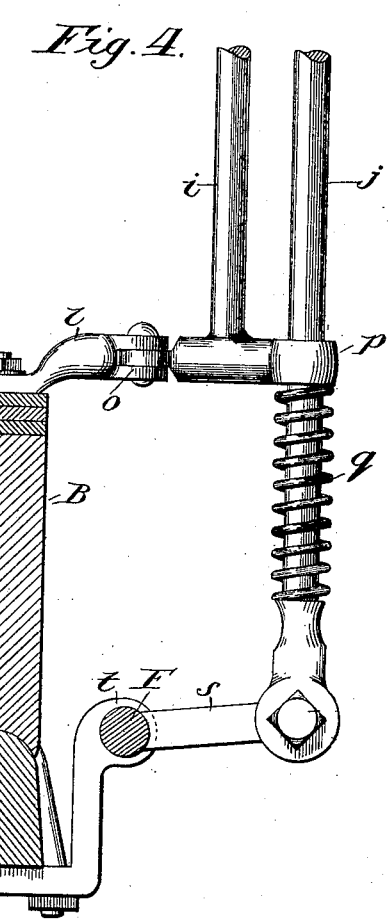
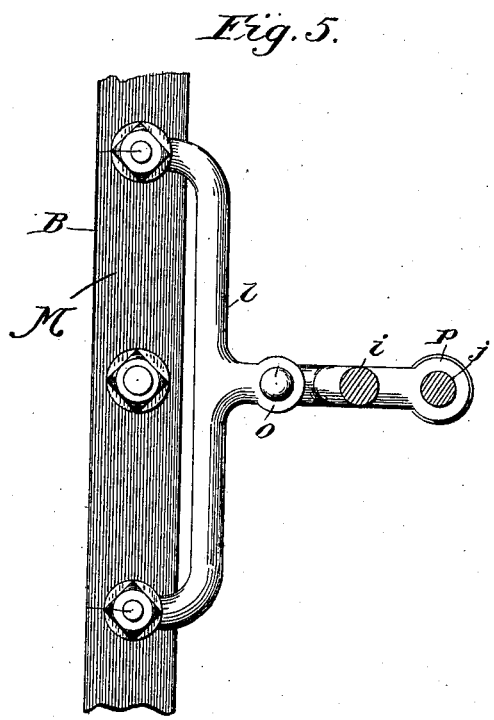

No. 763,276.

Patented June 21, 1904.

UNITED STATES PATENT OFFICE.

JOHN P. GARDNER, OF SAN FRANCISCO, CALIFORNIA.

HORSE-DETACHER.

SPECIFICATION forming part of Letters Patent No. 763,276, dated June 21, 1904.

Application filed July 7, 1903. Serial No. 164,534. (No model.)

*To all whom it may concern:*

Be it known that I, JOHN P. GARDNER, a resident of San Francisco, California, have invented a new and useful Improvement in Horse-Detachers, of which the following is a specification.

My invention relates to mechanism for detachably connecting a vehicle pole or thill to the vehicle-axle, which is adapted to be manipulated by the occupant of the vehicle to release the pole or thill in order that the horse or horses may be freed in case the latter should run away or any other accident befall the same.

The object of the invention is to provide a particularly simple, durable, and inexpensive mechanism which is highly efficient in operation.

To this end the invention includes the combination and arrangement of component parts, to be hereinafter described, and particularly pointed out in the claims.

In the accompanying drawings, which illustrate one exemplification of my invention, Figure 1 is a perspective view of the mechanism, showing the same applied to a vehicle. Fig. 2 is a detail plan view of one of the thill-couplings with related parts, portions of the mechanism being broken away. Fig. 3 is a sectional view taken transversely of the axle, showing parts of the connecting mechanism in side elevation. Fig. 4 is a sectional view taken transversely of the axle near the center of the same, showing a portion of the mechanism for releasing the catch in elevation; and Fig. 5 is a detail plan view.

The invention includes generally corresponding thill-coupling members secured to the front axle of the vehicle and each including a movable bolt for engaging a part on the related thill, and a displaceable locking device associated with each movable bolt, and means for manipulating said devices in unison without necessitating the occupant of the vehicle to alight from the latter.

The body of the vehicle is designated by E, the front axle by B, and the spring interposed between the latter and the body by M. As will be understood, the axle B is intended to have turning movement relative to the body E and spring M. Corresponding thill-coupling brackets A are secured to the axle B near opposite ends of the latter. Each bracket A includes a forwardly-projecting end $b$, in which a bolt $a$ is pivoted at one end, and a corresponding end $c'$, slotted to provide a guide and support for the free end of the bolt $a$.

A plurality of angularly-shaped brackets $k$ have their horizontal members bolted to the under side of the axle and vertical portions extending upwardly in advance of the axle and provided at their upper extremities $t$ with openings in which a rock-shaft F is journaled, the latter extending lengthwise of the axle B and being provided at its central portion with a crank $s$ and near its opposite ends with laterally-extending angular catches $h$, designed to engage the free ends of the bolts $a$ to lock the latter against movement.

A yoke $l$, rigidly secured to a part of the vehicle fixed in reference to the turning movement of the axle, as the spring M, is provided with a forward extension O, to which a bracket P is pivoted at its rear end, while the front end of the latter is provided with a guide-opening for an operating-rod $j$, which is designed to be manipulated to rock the shaft F. A vertical bar $i$ extends upwardly from the bracket P directly in the rear of the rod $j$, and pivoted to the bar is a hand-lever $x$, having one end connected to the rod $j$, so that as the lever $x$ is pressed against the bar $i$ the bar $j$ will be lifted against the tension of a helical spring $q$, interposed between the under side of bracket P and a shoulder on the rod $j$. The spring $q$ normally holds the rod $j$ depressed, in which position thereof the catches $h$ are held in the paths of movement of the bolts $a$ or in position to lock said bolts against movement.

In the operation of my mechanism the bolts $a$ are engaged with suitable surfaces of the thills, as the inner rear walls of straps D, secured to the rear ends of the thills C, and the free ends of the bolts are thereafter forced to the rear of the catches $h$ or between the latter and the axle. In this position of the parts all strain placed on the thills is transmitted to the bolts, and the latter are held at their pivoted ends by the brackets A and at their opposite or free ends by the adjacent catches

*h*. Should it be desired to instantly detach the thills from the vehicle, as in case the horse should run away, it is only necessary to manipulate the lever *x*, which will raise rod *j* against the tension of spring *q* and therethrough rock shaft F, carrying the catches *h* out of engagement with the bolts *a*, which will permit the latter to swing around and slip from engagement with the straps D.

The construction and operation of my invention will be readily understood upon reference to the foregoing description and accompanying drawings, and it will be appreciated that the parts and combinations recited may be varied within a wide range without departing from the spirit and scope thereof.

Having thus described my invention, what is claimed as new, and desired to be secured by Letters Patent, is—

1. The combination with an axle, and thill-couplings located upon opposite sides of the center thereof, each of said couplings including a bolt pivotally mounted at one end and surfaces carried by the thills to be engaged by said bolts, of a rock-shaft journaled on the axle, means for rocking the shaft, and catches extending laterally therefrom for detachably engaging the free ends of the bolts.

2. The combination with an axle and thill-coupling mechanism including a bracket secured to the axle on opposite sides of the center thereof and each carrying a swinging bolt pivoted at one end to the bracket and surfaces on the thills to be detachably engaged by said bolts, of a rock-shaft journaled on the axle having a crank intermediate of its length, and latches extending laterally from the shaft adjacent opposite ends thereof and designed to be moved into and out of the paths of movement of the free ends of said bolts as the shaft is rocked, a bracket carried by the vehicle, a rod guided in said bracket and connected to the crank of said shaft, and means for shifting said rod.

3. The combination with an axle and thill-coupling mechanism including a bracket secured to the axle on opposite sides of the center thereof and each carrying a swinging bolt pivoted at one end to the bracket and surfaces on the thills to be detachably engaged by said bolts, of a rock-shaft journaled on the axle having a crank intermediate of its length and latches extending laterally from the shaft adjacent opposite ends thereof and designed to be moved into and out of the paths of movement of the free ends of said bolts as the shaft is rocked, a bracket carried by the vehicle, a rod guided in said bracket, having a shoulder, and connected to the crank of the rock-shaft, a spring interposed between the shoulder of the rod and the bracket for normally holding the rod in depressed position, and means for raising the rod against the tension of the spring.

4. The combination with an axle and thill-coupling mechanism including a bracket secured to the axle on opposite sides of the center thereof and each carrying a swinging bolt pivoted at one end to the bracket and surfaces on the thills to be detachably engaged by said bolts, of a rock-shaft journaled on the axle having a crank intermediate of its length and latches extending laterally from the shaft adjacent opposite ends thereof and designed to be moved into and out of the paths of movement of the free ends of said bolts as the shaft is rocked, a bracket carried by the vehicle, a bar supported at its lower end by said bracket, a rod guided in said bracket and connected at its lower end to the rock-shaft, means for normally holding the rod in depressed position, and a lever carried by the bar and operatively connected to the rod for raising the same.

5. The combination with an axle and thill-coupling mechanism including a bracket secured to the axle on opposite sides of the center thereof and each carrying a swinging bolt pivoted at one end to the bracket and surfaces on the thills to be detachably engaged by said bolts, of a rock-shaft journaled on the axle having a crank intermediate of its length and latches extending laterally from the shaft adjacent opposite ends thereof and designed to be moved into and out of the paths of movement of the free ends of said bolts as the shaft is rocked, a bracket carried by the vehicle mounted to turn with the said axle, a rod guided in said bracket and connected to the crank of said shaft, and means for shifting said rod.

6. The combination with an axle and thill-coupling mechanism including a bracket secured to the axle on opposite sides of the center thereof and each carrying a swinging bolt pivoted at one end to the bracket and surfaces on the thills to be detachably engaged by said bolts, of a rock-shaft journaled on the axle having a crank intermediate of its length, and latches extending laterally from the shaft adjacent opposite ends thereof and designed to be moved into and out of the paths of movement of the free ends of said bolts as the shaft is rocked, a yoke bolted to a part of the vehicle fixed in reference to the turning movement of the axle, a bracket pivoted to said yoke having a guide-opening therethrough, a rod guided in said opening, means for holding the same depressed, and means for lifting the rod.

JOHN P. GARDNER.

Witnesses:
W. B. ACKER,
FLORA RAYMOND.